United States Patent [19]

Karayannis et al.

[11] 4,324,690

[45] Apr. 13, 1982

[54] ALPHA-OLEFIN POLYMERIZATION CATALYST

[75] Inventors: Nicholas M. Karayannis, Naperville; John S. Skryantz, Lisle, both of Ill.

[73] Assignee: Standard Oil Company (Indiana), Chicago, Ill.

[21] Appl. No.: 113,542

[22] Filed: Jan. 21, 1980

Related U.S. Application Data

[63] Continuation-in-part of Ser. No. 14,891, Feb. 15, 1979, abandoned.

[51] Int. Cl.$^3$ .................................................. C08F 4/64
[52] U.S. Cl. ............................ 252/429 B; 252/431 R; 252/431 C; 252/431 N; 252/431 P; 526/124
[58] Field of Search ........... 252/429 B, 431 R, 431 C, 252/431 N, 431 P

[56] References Cited

U.S. PATENT DOCUMENTS

| | | | |
|---|---|---|---|
| 2,956,993 | 10/1960 | Nowlin et al. | 252/429 C X |
| 3,718,636 | 2/1973 | Stevens et al. | 252/429 C X |
| 3,833,515 | 9/1974 | Amtmann et al. | 252/429 B |
| 3,888,835 | 6/1975 | Ito et al. | 252/429 B X |
| 3,901,863 | 8/1975 | Berger et al. | 252/429 C X |
| 3,950,268 | 4/1976 | Karayannis et al. | 252/429 B |
| 3,953,414 | 4/1976 | Galli et al. | 252/429 B X |
| 3,987,233 | 10/1976 | Sato et al. | 252/429 B X |
| 3,989,878 | 11/1976 | Aishima et al. | 252/429 B X |
| 3,989,879 | 11/1976 | Berger et al. | 252/429 B X |
| 4,006,101 | 2/1977 | Matsuura et al. | 252/429 C X |
| 4,027,088 | 5/1977 | Matsuura et al. | 252/429 C X |
| 4,069,169 | 1/1978 | Toyoda et al. | 252/429 B |
| 4,071,672 | 1/1978 | Kashiwa | 252/429 B X |
| 4,072,809 | 2/1978 | Rogan | 252/429 B X |
| 4,076,924 | 2/1978 | Toyota et al. | 252/429 B X |
| 4,085,276 | 4/1978 | Toyota et al. | 252/429 B X |
| 4,088,812 | 5/1978 | Matuura et al. | 252/429 C X |
| 4,115,319 | 9/1978 | Scata et al. | 252/429 B |
| 4,159,256 | 6/1979 | Sakurai et al. | 252/429 B |
| 4,159,963 | 7/1979 | Sakurai et al. | 252/429 B |
| 4,159,965 | 7/1979 | Sakurai et al. | 252/429 B |
| 4,171,284 | 10/1979 | Balint | 252/429 B |

FOREIGN PATENT DOCUMENTS

| | | |
|---|---|---|
| 874356 | 6/1979 | Belgium . |
| 2656055 | 6/1977 | Fed. Rep. of Germany . |
| 2701647 | 7/1977 | Fed. Rep. of Germany . |
| 2729196 | 1/1978 | Fed. Rep. of Germany . |
| 52-73991 | 6/1977 | Japan . |
| 52-98076 | 8/1977 | Japan . |
| 53-30493 | 3/1978 | Japan . |
| 53-90389 | 8/1978 | Japan . |
| 53-136086 | 11/1978 | Japan . |
| 53-136087 | 11/1978 | Japan . |
| 54-70385 | 6/1979 | Japan . |
| 54-70386 | 6/1979 | Japan . |
| 54-70387 | 6/1979 | Japan . |
| 54-70389 | 6/1979 | Japan . |
| 54-70390 | 6/1979 | Japan . |
| 1456464 | 11/1976 | United Kingdom . |
| 1538472 | 1/1979 | United Kingdom . |
| 1539175 | 1/1979 | United Kingdom . |
| 1539900 | 2/1979 | United Kingdom . |

*Primary Examiner*—Patrick Garvin
*Attorney, Agent, or Firm*—Stephen L. Hensley; William T. McClain; William H. Magidson

[57] ABSTRACT

Catalyst for the stereospecific polymerization of alpha-olefins of 3 or more carbon atoms comprising an organoaluminum component and a component prepared from halogen-containing compound of titanium(IV), organic electron donor, and a pretreatment product of components comprising magnesium alcoholate, organosilicon compound, and optionally, one or more Group II or IIIA metal alkyls, pretreatment modifiers such as a mineral acid or anhydride of sulfur, organometallic chalcogenide derivative of hydrogen sulfide, organic acid or organic acid ester, or combination of metal alkyl and modifier. Preferably, the product obtained from such materials is mechanically activated prior to polymerization use.

17 Claims, No Drawings

ALPHA-OLEFIN POLYMERIZATION CATALYST

This is a continuation-in-part of our copending application Ser. No. 14,891, filed Feb. 15, 1979, now abandoned.

This invention relates to the polymerization of alpha-olefins, and more particularly, to improved supported catalyst components for the polymerization of alpha-olefins.

In our co-pending application Ser. No. 14,891, filed Feb. 15, 1979, now abandoned we have disclosed new, highly active catalysts for the stereospecific polymerization of alpha-olefins comprising an organoaluminum component and a supported component comprising the reaction product of components comprising (1) at least one halogen-containing titanium compound, (2) at least one organic electron donor and (3) at least one hydrocarbon-insoluble reaction product of components comprising (a) at least one magnesium alkoxide and (b) at least one Group II or IIIA metal alkyl. Preferably, the components in (3) also include at least one modifying component selected from the group consisting of mineral acids and anhydrides of sulfur, organometallic chalcogenide derivatives of hydrogen sulfide, organic acids and esters thereof. For polymerization use, such catalysts preferably are used in conjunction with a crystallinity promoting third component to maximize polymer crystallinity. Mechanical activation of the supported component, such as by ball-milling, enhances the susceptibility of the component to improvements in stereospecificity through the use of crystallinity promoting third components.

In the polymerization of alpha-olefins, the catalysts of Ser. No. 14,891 exhibit sufficiently high activities that removal of catalyst residues from polymeric products produced in the presence thereof is unnecessary. Further, due to the high stereospecificity of the catalysts of Ser. No. 14,891, the fraction of commercially undesirable products, such as low molecular weight and amorphous components, in the total polymerizate is sufficiently low that separation of such undesirable products is unnecessary. Although the solubility of low molecular weight and amorphous components and insolubility of the commercially desirable high molecular weight, crystalline fraction of the product in alkanes such as hexane and heptane affords a convenient means for separating the former from the latter, it is economically advantageous to dispense with the separation step because solvent recovery and purification and disposal of the undesirable alkane soluble materials add cost to polymerization processes.

We have found that the use of certain silicon compounds in place of or in addition to the Group II or IIIA metal alkyl components and optional pretreatment modifiers employed according to Ser. No. 14,891 yields supported catalyst components which exhibit desirable performance in the polymerization of alpha-olefins. Typically, the invented catalysts are sufficiently active and stereospecific that levels of catalyst residues and low molecular weight and amorphous byproducts in the total polymerizate are sufficiently low that separation is unnecessary. As compared to the catalysts of Ser. No. 14,891, the invented catalysts typically are generally comparable or somewhat lower in activity but more stereospecific.

Japanese Patent Publication No. 53-136087 to Mitsubishi may be of interest to the present invention in disclosing the use of certain silicon compounds in the preparation of supported catalyst components. That publication is directed to stereospecific catalysts having sufficiently high activities that there is no need to separate catalyst residues from the polymerizate. The disclosed catalyst components are prepared by contacting (1) a silanol or polysilanol, (2) a compound of the formula $Mg(OR)_n X_{2-n}$ wherein R is a hydrocarbyl radical of 1 to 20 carbon atoms, X is halogen and n is greater than 0 but less than or equal to 2, (3) a titanium tetrahalide and (4) at least one electron donor selected from the group consisting of amines, carboxylic acid amides, phosphines, phosphoric acid esters, phosphoric acid amides, ketones and carboxylic acid esters. According to an example of the cited publication, the magnesium compound and polysilanol are treated with electron donor and then the result is reacted with the titanium tetrahalide. The resultant catalyst component is combined with an organoaluminum compound such as triethylaluminum for use in the polymerization of olefins.

The catalysts of the present invention are distinguishable from those of Japanese Patent Publication No. 53-136087 in that preparation of the invented supported components involves the use of electron donors simultaneously with or subsequent to contact between a magnesium containing support material and halogen-containing titanium compound. In contrast, the cited publication is directed to contact between electron donors and magnesium containing support material prior to contact with titanium tetrahalides. Further, the cited publication does not disclose the use of metal alkyls or pretreatment modifiers according to the present invention.

Also of interest is Japanese Kokai No. 52-98076 to Mitsubishi, which discloses stereospecific supported components prepared from a magnesium alkoxide or aryloxide, a titanium tetrahalide, an organic electron donor, and optionally, a halogenated silane. The supported component is prepared by a variety of techniques, each of which involves contacting the magnesium compound with the electron donor and/or the silane by mechanical grinding or in an inert, liquid hydrocarbon followed by reacting the result with the titanium compound or an adduct thereof with the electron donor, again by grinding or in an inert hydrocarbon. The examples of this patent illustrate that polymerization of propylene in the presence of catalysts containing the disclosed supported components gave products containing about 20 to 30% boiling n-heptane extractables. Solubles are not reported.

Silicon compounds also have been used in preparation of supported catalyst components wherein the starting magnesium compound is other than an alcoholate. Examples of such catalyst components are disclosed in the following: Japanese Patent Publication Nos. 53-090389, 54-070385, 54-070386, 54-070387, 54-070389 and 54-070390 all to Mitsubishi (Grignard compounds with silanols or polysilanols); U.S. Pat. No. 3,833,515 to Amtmann et al., U.S. Pat. No. 3,987,233 to Sato et al., U.S. Pat. No. 4,006,101 to Matsuura et al., U.S. Pat. No. 4,071,672 to Kashiwa, U.S. Pat. No. 4,085,276 to Toyota et al., and British Pat. No. 1,539,900 to British Petroleum (magnesium halides with various silicon compounds); Japanese Patent Publication No. 53-136086 to Mitsubishi (magnesium hydrides with silanols or polysilanols); U.S. Pat. No. 4,159,256 to Sakurai et al. (hydrocarbon-soluble organometallic complexes containing magnesium and at least one other Group I to III metal with chlorosilanes); and Belgium Ser. No. 874,356 to Sumitomo (organomagnesium compounds with organosilicon halides).

DESCRIPTION OF THE INVENTION

Briefly, the stereospecific supported catalyst components of this invention comprise the solid reaction product of components comprising (1) at least one halogen-containing compound of titanium(IV); (2) at least one organic electron donor; and (3) at least one hydrocarbon-insoluble, magnesium-containing pretreatment product of components comprising (a) at least one magnesium alcoholate and (b) at least one organosilicon compound. Optionally, the components in (3) further comprise at least one Group II or IIIA metal alkyl, at least one pretreatment modifier selected from the group consisting of mineral acids and anhydrides of sulfur, organometallic chalcogenide derivatives of a hydrogen sulfide, organic acids, esters thereof or mixture of such metal alkyls with such modifying compounds. For purposes hereof, "pretreatment product" is defined as a hydrocarbon-insoluble product which is essentially free of incompletely reacted organosilicon component and Group II or IIIA metal alkyl if used.

In somewhat greater detail, the magnesium-containing pretreatment product, (3), employed according to this invention is obtained by contacting components comprising (a) at least one magnesium alcoholate of the formula $Mg(OR^1)_n(OR^2)_{2-n}$ wherein $R^1$ and $R^2$ are identical or different hydrocarbyl radicals of 1 to about 20 carbon atoms and n ranges from 0 to 2; and (b) at least one organosilicon compound having at least one organic radical of 1 to about 20 carbon bonded to silicon. Optionally, the pretreatment components further comprise at least one Group II or IIIA metal alkyl, at least one modifier selected from the group consisting of mineral acids and anhydrides of sulfur, organometallic chalcogenide derivatives of hydrogen sulfide, organic acids and esters thereof, or a mixture of such metal alkyls and modifiers.

Specific examples of magnesium alcoholates which are useful according to this invention include $Mg(OCH_3)_2$, $Mg(OC_2H_5)_2$, $Mg(OC_4H_9)_2$, $Mg(OC_6H_5)_2$, $Mg(OC_6H_{13})_2$, $Mg(OC_9H_{19})_2$, $Mg(OC_{10}H_7)_2$, $Mg(OC_{12}H_{25})_2$, $Mg(OC_{16}H_{33})_2$, $Mg(OC_{20}H_{41})_2$, $Mg(OCH_3)(OC_2H_5)$, $Mg(OCH_3)(OC_6H_5)$, $Mg(OCH_3)(OC_6H_{13})$, $Mg(OC_2H_5)(OC_8H_{17})$, $Mg(OC_6H_{13})(OC_{20}H_{41})$, and $Mg(OC_{16}H_{33})(OC_{18}H_{37})$. Mixtures of magnesium alcoholates also can be employed if desired. Additionally, although not preferred, mixtures of magnesium alcoholates with minor amounts of other suitable metal salts such as alcoholates of lanthanum and the lanthanide metals, magnesium halides, hydroxyhalides, carboxylates, and so forth can be used.

From the standpoint of cost and availability, magnesium alcoholates which are preferred for use according to this invention are those of the formula $Mg(OR^1)_2$ wherein $R^1$ is as defined above. In terms of catalytic activity and stereospecificity, best results are achieved through the use of magnesium alcoholates of the formula $Mg(OR^1)_2$ wherein $R^1$ is an alkyl radical of 1 to about 6 carbon atoms, an aryl radical of 6 to about 12 carbon atoms or an alkaryl or aralkyl radical of 6 to about 12 carbon atoms. Magnesium ethoxide gives best results.

Useful organosilicon compounds are those having at least one $C_{1-20}$ hydrocarbyl group bonded to silicon. Specific examples of such compounds include silanes represented by the formula $R_xSiX_{4-x}$ wherein each R is independently a hydrocarbyl radical of 1 to about 20 carbon atoms, X is hydrogen or halogen and $1 \leq x \leq 4$; hydrocarbyl disilazanes and trisilazanes containing 1 to about 20 carbon atoms per alkyl radical; and liquid polysiloxanes represented by the formula

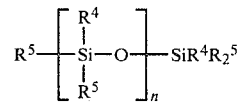

wherein each $R^4$ is independently a hydrocarbyl radical of 1 to about 20 carbon atoms, each $R^5$ is independently hydrogen or $R^4$ and n is at least 2 though not so great that the polysiloxane is a solid under pretreatment conditions. Mixtures of organosilicon compounds also can be employed if desired.

Preferred silanes are those wherein each R in the formula is a alkyl radical containing 1 to about 6 carbon atoms and X is chlorine or hydrogen. Specific examples of such compounds include tetramethylsilane, tetraethylsilane, tetra-n-hexylsilane, trimethylhydrogensilane, tri-n-propylchlorosilane, dimethyldichlorosilane, di-n-butyldichlorosilane, monomethyltrihydrogensilane and mono-n-hexyltrichlorosilane.

Preferred hydrocarbyl di- and trisilazanes are those wherein the hydrocarbyl radicals are alkyl of 1 to about 6 carbon atoms. Specific examples include hexamethyldisilazane and hexamethylcyclotrisilazane.

Preferred polysiloxanes are linear or cyclic compounds wherein each $R^4$ in the formula is an alkyl radical of 1 to about 6 carbon atoms. Specific examples include polymethylsiloxane, polymethylhydrogensiloxane, octamethylcyclotetrasiloxane, polyethylsiloxane, poly-n-propylhydrogensiloxane and poly-n-hexylsiloxane.

Among the aforesaid organosilicon compounds, the silanes are preferred from the standpoint of attaining optimum combinations of stereospecificity and activity. Most preferably, the organosilicon component employed according to this invention is dimethyldichlorosilane.

As indicated hereinabove, the organosilicon component employed according to the present invention can be used in conjunction with the Group II or IIIA metal alkyl component and/or pretreatment modifiers employed according to Ser. No. 14,891.

Useful Group II and IIIA metal alkyls are compounds of the formula $MR^3_m$ wherein M is a Group II or IIIA metal, each $R^3$ is independently an alkyl radical of 1 to about 20 carbon atoms, and m corresponds to the valence of M. Examples of useful metals, M, include magnesium, calcium, zinc, cadmium, aluminum, and gallium. Examples of suitable alkyl radicals, $R^3$, include methyl, ethyl, butyl, hexyl, decyl, tetradecyl, and eicosyl.

When Group II or IIIA metal alkyl component is used according to this invention it is preferred to use at least one magnesium, zinc, or aluminum alkyl wherein the alkyl radicals contain 1 to about 12 carbon atoms. Specific examples of such compounds include $Mg(CH_3)_2$, $Mg(C_2H_5)_2$, $Mg(C_2H_5)(C_4H_9)$, $Mg(C_4H_9)_2$, $Mg(C_6H_{13})_2$, $Mg(C_{12}H_{25})_2$, $Zn(CH_3)_2$, $Zn(C_2H_5)_2$, $Zn(C_4H_9)_2$, $Zn(C_4H_9)(C_8H_{17})$, $Zn(C_6H_{13})_2$, $Zn(C_{12}H_{25})_2$, $Al(CH_3)_3$, $Al(C_2H_5)_3$, $Al(C_3H_7)_3$, Al(C$_4$H$_9$)$_3$, Al(C$_6$H$_{13}$)$_3$, and Al(C$_{12}$H$_{25}$)$_3$. More preferably a magnesium, zinc, or aluminum alkyl containing 1 to about 6 carbon atoms per alkyl radical is used. Best results are achieved through the use of trialkylaluminums containing 1 to about 6 carbon atoms per alkyl radical, and particularly triethylaluminum.

Modifiers useful as pretreatment components are mineral acids and anhydrides of sulfur, organometallic chalcogenide derivatives of hydrogen sulfide, organic acids, organic acid esters, and mixtures thereof.

Specific examples of useful mineral acids and anhydrides of sulfur include sulfur dioxide, sulfur trioxide, sulfuric acid, fuming sulfuric acid, and halosulfonic acids such as chlorosulfonic and fluorosulfonic acids. Hydrogen sulfide, which behaves as a weak acid in aqueous solution, also is considered a mineral acid of sulfur for purposes hereof. Also contemplated are the organometallic chalcogenide derivatives of hydrogen sulfide in which each hydrogen is replaced by an organosilicon, organogermanium, or organotin group wherein the organic radicals are selected from the group consisting of phenyl, alkyl-substituted phenyl, phenyl-substituted alkyl, and alkyl radicals, such alkyl radicals containing 1 to about 6 carbon atoms. Specific examples of useful organometallic chalcogenide pretreatment modifiers include bis-(triphenyltin)sulfide, bis(tritolyltin)sulfide, bis-(triethylphenyltin)sulfide, bis(-trihexylphenyltin)sulfide, bis(triphenylmethyltin)sulfide, bis(triphenylethyltin)sulfide, bis(triphenylhexyltin)sulfide, bis-(trimethyltin)sulfide, bis(triethyltin)sulfide, bis-(tributyltin)sulfide, bis(trihexyltin)sulfide, and similar silicon- and germanium-containing compounds.

Among the mineral acids and anhydrides of sulfur and organometallic chalcogenide derivatives, sulfuric acid, fuming sulfuric acid, chlorosulfonic acid, and hydrogen sulfide are preferred because they lead to the best overall improvements in activity and stereospecificity.

Organic acids useful as pretreatment components according to this invention are acids containing from 1 to about 20 carbon atoms and 1 to about 4 carboxyl groups. Such acids include aliphatic acids of 1 to about 20 carbon atoms; halogen-, hydroxyl-, oxo-, alkyl, alkoxy-, aryl-, and/or aryloxy-substituted aliphatic acids of 1 to about 20 carbon atoms; aromatic acids of 7 to about 14 carbon atoms; and halogen-, hydroxyl-, oxo-, alkyl-, alkoxy-, aryl-, and/or aryloxy-substituted aromatic acids of 7 to about 20 carbon atoms. Monocarboxylic acids are preferred over the polycarboxylic acids.

Specific examples of useful aliphatic acids include saturated acids such as formic acid, acetic acid, oxalic acid, malonic acid, butyric acid, pivalic acid, valeric acid, glutaric acid, caproic acid, cyclohexanecarboxylic acid, suberic acid, lauric acid, stearic acid, and arachidic acid; and unsaturated acids such as acrylic acid, crotonic acid, isocrotonic acid, vinylacetic acid, allylacetic acid, maleic acid, hydrosorbic acid, sorbic acid, undecenoic acid, oleic acid, and stearolic acid.

Specific examples of useful substituted aliphatic acids include chloroacetic acid, phenylacetic acid, chloromalonic acid, benzylmandellic acid, bromobutyric acid, ketobutyric acid, 2-hydroxyhexanoic acid, linoleic acid tetrabromide, 3-chloro-2-butenoic acid, benzallactic acid, mucochloric acid, mucobromic acid, piperic acid, and ketocaproic acid.

Specific examples of useful aromatic acids and substituted aromatic acids include benzoic acid, phthalic acid, trimellitic acid, pyromellitic acid, naphthoic acids, chlorobenzoic acids, chloronaphthoic acids, hydroxynaphthoic acids, toluic acids, xylilic acids, isodurylic acids, butylbenzoic acids, dihexylbenzoic acids, anisic acid, veratric acid, asaronic acid, ethoxybenzoic acids, piperonylic acids, vanillic acid, cresotic acid, and everninic acid.

Organic acid esters useful as pretreatment components according to this invention include alkyl and haloalkyl esters of acids such as are described above wherein the alkyl group or groups contain 1 to about 12 carbon atoms, and aryl and haloaryl esters of such acids wherein the aryl group or groups contain 6 to about 10 carbon atoms. Specific examples of useful organic acid esters include the methyl, chloromethyl, ethyl, chlorethyl, bromoethyl, butyl, hexyl, cyclohexyl, octyl, chlorododecyl, phenyl, chlorophenyl, and naphthyl esters of acids such as are named above.

Preferred among the aforesaid organic acids and esters are benzoic acid, halobenzoic acids and the alkyl esters thereof wherein the alkyl group contains 1 to about 6 carbon atoms such as methyl benzoate, methyl bromobenzoates, ethyl benzoate, ethyl chlorobenzoates, butyl benzoate, isobutyl benzoate, hexyl benzoate, and cyclohexyl benzoate, as these give good results in terms of activity and stereospecificity and are convenient to use.

Mixtures of pretreatment modifiers which are preferred are combinations of at least one of the above-described mineral acids or anhydrides of sulfur or organometallic chalcogenide derivatives with at least one of the above-described organic acids or organic acid esters. More preferred combinations are those containing at least one of the preferred sulfur-containing modifiers identified above (i.e., sulfuric acid, fuming sulfuric acid, chlorosulfonic acid, and hydrogen sulfide) and at least one of the preferred organic acids and esters identified above (i.e., benzoic acid, halobenzoic acids, and the C$_1$ to about C$_6$ alkyl esters thereof). When pretreatment modifier is used, best results are obtained through the use of a combination of chlorosulfonic acid and methyl benzoate.

The magnesium-containing pretreatment product employed in preparation of the invented catalyst components is obtained by contacting components comprising at least one magnesium alcoholate and at least one organosilicon component. Optionally, at least one of the above-described metal alkyls and/or pretreatment modifiers also is employed in preparation of the pretreatment product. The amount of organosilicon component employed in pretreatment is an amount which is effective to improve the polymerization performance of the catalyst component which ultimately forms. In the case of silanes and silazanes an effective amount preferably ranges from about 0.001 to about 1 mole per gram atom of metal in the magnesium alcoholate component. More preferably, from about 0.005 to about 0.5 mole silane or silazane is used per gram atom of metal in the magnesium alcoholate component in order to attain the desired improvement without waste of organosilicon component. With respect to the polysiloxanes, an effective amount preferably ranges from about 0.1 to about 1000 ml. per gram atom of metal in the magnesium alcoholate component used in pretreatment. More preferably, to attain the desired improvement without waste of polysiloxane, 50 to about 200 ml. polysiloxane are used per gram atom of metal in the magnesium alcoholate component.

If Group II or IIIA metal alkyl component is used in pretreatment it preferably is used in an amount such that the atomic ratio of Group II or IIIA metal to metal in the magnesium alcoholate component ranges from about 0.001:1 to about 1:1. More preferably, this ratio ranges from about 0.005:1 to about 0.5:1. Pretreatment modifier component, if used, preferably is used in an amount ranging from about 0.001 to about 2 moles per gram atom of metal in the magnesium alcoholate component. Preferred modifier mixtures are those containing about 0.5 to about 20 moles organic acid or ester per mole of sulfur-containing modifier.

As indicated above, the pretreatment product employed according to this invention is free of organosilicon component and Group II or IIIA metal alkyl if used and is prepared by contacting the pretreatment components and subsequently removing unreacted organosilicon component and metal alkyl if used. Although not required, it is preferred to contact the components in the presence of an inert diluent to aid in conductance of heat evolved on reaction of the magnesium alcoholate and organosilicon components away from the reaction product and further, because in the absence of a diluent the magnesium alcoholate and organosilicon components typically react to form a sticky mass which can be difficult to handle in subsequent preparative manipulations. Although it is preferred to contact the pretreatment components in the presence of an inert diluent, other techniques such as pulverization of magnesium alcoholate in the presence of organosilicon component and optional metal alkyl and/or modifier components or fluidized bed treatment of magnesium alcoholate with organosilicon component, and optional metal alkyl and/or modifier components, also can be employed. Most preferably, neat organosilicon component is added to a suspension of magnesium alcoholate in an inert diluent. Modifier components, when used, can be employed in any convenient form. Group II or IIIA metal alkyl, when used, preferably is in the form of a solution in an inert liquid hydrocarbon, e.g., hexane.

Diluents suitable for use in pretreatment include hydrocarbons and halogenated derivatives thereof that are substantially inert to the pretreatment components employed and are liquid at pretreatment temperatures or can be maintained in the liquid state at such temperatures through the use of increased pressures. Examples of useful diluents include alkanes such as hexane, cyclohexane, ethylcyclohexane, heptane, octane, nonane, decane, undecane, and so forth; aromatics such as xylenes and ethylbenzene; and halogenated and hydrogenated aromatics such as chlorobenzene, o-dichlorobenzene, tetrahydronaphthalene, and decahydronaphthalene. Preferred diluents are the alkanes and especially hexane.

The sequence in which the pretreatment components are contacted is not critical. When pretreatment is carried out without the use of Group II or IIIA metal alkyl or pretreatment modifier, magnesium alcoholate and organosilicon components are simply combined. When one or more Group II or IIIA metal alkyl or modifier components are employed, it is preferred to add a solution of organosilicon component, Group II or IIIA metal alkyl and/or modifier in an inert liquid hydrocarbon to the magnesium alcoholate component.

Pretreatment according to this invention is carried out at temperatures ranging from about $-30°$ to about $130°$ C. Preferably, the pretreatment temperature ranges from about $0°$ to about $60°$ C., with about $10°$ to about $30°$ C. being more preferred from the standpoint of convenience. The time of pretreatment generally ranges from several minutes to several hours, with about 1 to about 10 hours being preferred. When pretreatment is conducted in the presence of an inert diluent, it is desirable to agitate the components during pretreatment to ensure thorough contacting of the components.

Following contacting of pretreatment components as described above, unreacted organosilicon component and, if used, Group II or IIIA metal alkyl component, is removed from the reaction product to avoid contamination of the product and possible reduction of the titanium component employed in subsequent preparative steps. When pretreatment is conducted in the presence of an inert diluent, the reaction product preferably is separated from the diluent, for example by filtration or decantation, and unreacted organosilicon component is removed therefrom by washing with hexane or another alkane.

The above-described pretreatment is conducted in the substantial absence of water, oxygen, carbon oxides, and other extraneous materials capable of adversely affecting the performance of the invented catalyst components. Such materials are conveniently excluded by carrying out the pretreatment in the presence of an inert gas such as nitrogen or argon, or by other suitable means. It also is contemplated to conduct all or part of the pretreatment in the presence of one or more alpha-olefins which, when introduced into the preparative system in gaseous form, can serve to exclude catalyst poisons. The presence of one or more alpha-olefins during pretreatment also can result in improved stereospecificity. Useful alpha-olefins include ethylene, propylene, butene-1, pentene-1, 4-methylpentene-1, hexene-1, and mixtures thereof. Of course, any alpha-olefin employed during pretreatment should be of relatively high purity, for example, polymerization grade or higher. Other precautions which aid in excluding extraneous poisons include purification of any diluent to be employed, such as by percolation through molecular sieves and/or silica gel prior to use, and drying and/or heating of magnesium alcoholate pretreatment components.

As a result of the pretreatment in accordance with this invention, there is obtained a hydrocarbon-insoluble, magnesium-containing, solid pretreatment product which can be reacted with at least one halogen-containing titanium(IV) compound and at least one organic electron donor to form a stereospecific supported catalyst component useful in the stereospecific polymerization of alpha-olefins of 3 or more carbon atoms.

Titanium(IV) compounds useful in preparation of the stereospecific supported catalyst components of this invention are titanium halides and haloalcoholates having 1 to about 20 carbon atoms per alcoholate group such as methoxy, ethoxy, butoxy, hexoxy, phenoxy, decoxy, naphthoxy, dodecoxy, and eicosoxy. Mixtures of titanium compounds can be employed if desired.

Preferred titanium compounds are the halides and haloalcoholates having 1 to about 8 carbon atoms per alcoholate group. Examples of such compounds include $TiCl_4$, $TiBr_4$, $Ti(OCH_3)Cl_3$, $Ti(OC_2H_5)Cl_3$, $Ti(OC_4H_9)Cl_3$, $Ti(OC_6H_5)Cl_3$, $Ti(OC_6H_{13})Br_3$, $Ti(OC_8H_{17})Cl_3$, $Ti(OCH_3)_2Br_2$, $Ti(OC_2H_5)_2Cl_2$, $Ti(OC_6H_{13})_2Cl_2$, $Ti(OC_8H_{17})_2Br_2$, $Ti(OC_{10}H_7)_2Cl_2$, $Ti(OCH_3)_3Br$, $Ti(OC_2H_5)_3Cl$, $Ti(OC_4H_9)_3Cl$, $Ti(OC_6H_{13})_3Br$, and $Ti(OC_8H_{17})_3Cl$. Titanium tetrahalides and particularly TiCl$_4$ are most preferred from the standpoint of attaining maximum activity and stereospecificity.

Organic electron donors useful in preparation of the stereospecific supported catalyst components of this invention are organic compounds containing oxygen, nitrogen, sulfur, and/or phosphorus. Such compounds include organic acids, organic acid esters, alcohols, ethers, aldehydes, ketones, amines, amine oxides, amides, thiols, various phosphorus acid esters and amides, and the like. Mixtures of organic electron donors can be employed if desired.

Specific examples of useful oxygen-containing electron donors include the organic acids and esters employed as pretreatment modifiers as described above, alphatic alcohols such as methanol, ethanol, propanols, butanols, pentanols, hexanols, and so forth, aliphatic diols and triols such as ethylene glycol, propanediols, glycerol, butanediols, butanetriols, pentanediols, pentanetriols, hexanediols, hexanetriols, and so forth; aromatic alcohols such as phenol, di-, tri-, and tetrahydroxybenzenes, naphthols, and dihydroxynaphthalenes; aralkyl alcohols such as benzyl alcohol, phenylethanols, phenylpropanols, phenylbutanols, phenylpentanols, phenylhexanols, and so forth; alkaryl alcohols such as cresols, xylenols, ethylphenols, propylphenols, butylphenols, pentylphenols, hexylphenols, and so forth; dialkyl ethers such as dimethyl, diethyl, methylethyl, dipropyl, dibutyl, dipentyl, dihexyl ethers, and so forth; alkylvinyl and alkylallyl ethers such as methyl-, ethyl-, propyl-, butyl-, pentyl-, and hexylvinyl, and hexylallyl ethers; alkaryl ethers such as anisole, phenetole, propylphenyl ether, butylphenyl ether, pentylphenyl ether, hexylphenyl ether and so forth; arylvinyl and arylallyl ethers such as phenylvinyl ether and phenylallyl ether; diaryl ethers such as diphenyl ether and cyclic ethers such as dioxane and trioxane.

Specific examples of other suitable oxygen-containing organic electron donors include aldehydes such as formaldehyde, acetaldehyde, propionaldehyde, butyraldehyde, valeraldehyde, caproaldehyde, and so forth, benzyladehyde, tolualdehyde, and alpha-tolualdehyde; and ketones such as acetone, diethyl ketone, methyl ethyl ketone, dipropyl ketone, dibutyl ketone, dipentyl ketone, dihexyl ketone, and so forth, cyclobutanone, cyclopentanone, and cyclohexanone, acetophenone, propiophenone, butyrophenone, valerophenone, caprophenone, and so forth, and diphenyl ketone.

Specific examples of useful nitrogen-containing organic electron donors include tertiary amines wherein at least one of the groups bonded to nitrogen contains at least two carbon atoms such as dimethylethylamine, methyldiethylamine, N,N'-tetramethylethylenediamine, triethylamine, tri-n-butylamine, dimethyl-n-hexylamine, tetraethylputrescine, diphenylmethylamine, triphenylamine, tritolylamine, diphenylbenzylamine, triphenylethylamine, triethylphenylamine, bis(diethylamino)-benzenes, and the like; saturated heterocyclic amines and derivatives thereof such as pyrrolidine, piperidine, 2-methylpyrrolidine, 2-methylpiperidine, 2,5-dimethylpyrrolidine, 2,6-dimethylpiperidine, 2,4,6-trimethylpiperidine, 2,2,6,6-tetramethylpiperidine, and the like; unsaturated heterocyclic amines and derivatives thereof such as pyridine and pyrimidine, picolines, lutidines, collidines, ethylpyridines, diethylpyridines, triethylpyridines, benzylpyridines, methylpyrimidines, ethylpyrimidines, benzylpyrimidines, and the like.

Examples of useful sulfur containing organic electron donors include thiols such as methanethiol, ethanethiol, ethanedithiol, propanethiols, butanethiols, butanedithiols, hexanethiols, and the like; thioethers such as ethylthioethane, ethylthio-n-butane, and the like; and other thio analogues of the above-described oxygen-containing organic electron donors.

Specific examples of useful phosphorus-containing organic electron donors include phosphorus analogues of the above-described nitrogen-containing organic electron donors such as triethylphosphine, ethyldibutylphosphine, triphenylphosphine, and the like.

Examples of useful organic electron donors containing two or more of oxygen, nitrogen, sulfur, and phosphorus include amides such as acetamide, butyramide, caproamide, benzamide, and the like, aminoalcohols such as ethanolamine, hydroxyanilines, aminocresols, and the like; amine oxides such as lutidine-N-oxides and collidine-N-oxides; aminoethers such as bis(2-ethoxyethyl)-amine; thioacids such as thioacetic acid, thiobutyric acid, thiovaleric acid, thiobenzoic acid, and the like; organosulfonic acids such as methanesulfonic acid, ethanesulfonic acid, phenylsulfonic acid, and the like; various phosphorus acid derivatives such as trimethyl phosphite, tri-n-propyl phosphite, triphenyl phosphite, triethyl trithiophosphite, hexamethylphosphoric triamide, and the like; and phosphine oxides such as triethylphosphine oxide, triphenylphosphine oxide, and the like.

From the standpoint of catalyst performance and preparative ease, the organic electron donors which are preferred according to this invention are $C_{1-6}$ alkyl esters of aromatic monocarboxylic acids and halogen-, hydroxyl-, oxo-, alkyl-, alkoxy-, aryl-, and/or aryloxy-substituted aromatic monocarboxylic acids. Among these, the alkyl esters of benzoic and halobenzoic acids wherein the alkyl group contains 1 to about 6 carbon atoms, such as methyl benzoate, methyl bromobenzoate, ethyl benzoate, ethyl chlorobenzoate, ethyl bromobenzoate, butyl benzoate, isobutyl benzoate, hexyl benzoate, and cyclohexyl benzoate. Best results are attained through the use of ethyl benzoate.

In preparation of the stereospecific supported catalyst components of this invention, the magnesium-containing pretreatment product, titanium(IV) component, and organic electron donor component are contacted in amounts such that the atomic ratio of titanium to metal in the magnesium alcoholate component employed in pretreatment is at least about 0.5:1. Preferably, this ratio ranges from about 0.5:1 to about 20:1. Greater amounts of titanium can be employed without adversely affecting catalyst component performance, but there typically is no need to exceed a titanium to magnesium ratio of about 20:1 as only a portion of the titanium is affixed to the pretreatment product during the preparative reaction. More preferably, the titanium to magnesium ratio ranges from about 2:1 to about 15:1 to ensure that the catalyst components contain sufficient titanium to exhibit good activities without being wasteful of the titanium compound employed in preparation. The electron donor component is employed in an amount ranging from about 0.001 to about 1.0 mole per gram atom of titanium, and preferably from about 0.005 to about 0.6 mole per gram atom. Best results are achieved when this ratio ranges from about 0.01 to about 0.3 mole per gram atom of titanium.

The sequence in which the components are contacted is not critical except that pretreatment product and electron donor are contacted in the presence of titanium component. Suitably, pretreatment product, titanium-(IV) component, and electron donor component are contacted concurrently or titanium(IV) component and either pretreatment product or electron donor are combined followed by addition of the remaining component. From the standpoint of catalyst performance and preparative ease, the preferred preparative sequence is to combine the pretreatment product and titanium(IV) component and then add the organic electron donor component to the resulting mixture.

According to the invention, the pretreatment product, titanium(IV), and electron donor components preferably are contacted in the presence of an inert hydrocarbon or halogenated hydrocarbon diluent, although other suitable techniques can be employed. Suitable diluents are materials which are liquid at the temperatures employed or can be maintained in the liquid state at such temperatures through the use of increased pressure and are substantially inert to the components employed in preparation. As in the case of the diluents employed in pretreatment, it is desirable to purify any diluent to be employed to remove water, oxygen, carbon oxides, and other extraneous catalyst poisons. Examples of suitable diluents include materials such as are identified above as suitable pretreatment diluents, with nonane being preferred.

Reaction between the pretreatment product, titanium component, and organic electron donor is carried out at temperatures ranging from about 50° to about 170° C. Best results are obtained at about 130° to about 160° C. Generally the reaction is carried out over a period of several minutes to several hours, with about ½ to about 10 hours giving good results at economical rates. Most preferably, the reaction time ranges from about 1 to about 5 hours. When the components employed in preparation of the invented catalyst components are contacted according to the preferred preparative sequence, best results are obtained when the pretreatment product and titanium(IV) component are combined at about ambient temperature followed by addition of electron donor, at about ambient temperature and with agitation, over about ¼ to about 1½ hours and then heating at about 130° to about 160° C. for about ½ to about 3 hours with continued agitation.

Due to the sensitivity of the invented catalyst components to catalyst poisons such as water, oxygen, and carbon oxides, the catalyst components are prepared in the substantial absence of such materials. Catalyst poisons can be conveniently excluded by carrying out the preparation under an atmosphere of an inert gas such as nitrogen or argon or an atmosphere of alpha-olefin as in pretreatment. As noted above, purification of any diluent to be employed also aids in removing poisons from the preparative system.

As a result of the above-described preparation there is obtained a solid, stereospecific supported catalyst component. Incompletely reacted starting materials are separated from the catalyst component, for example, by washing with a suitable solvent such as hexane or another alkane. Preferably, removal of unreacted starting materials is effected within a short time after completion of the preparative reaction because prolonged contact between the catalyst component and unreacted starting materials tends to adversely affect catalyst component performance.

Although the chemical structure of the invented catalyst components is not presently known, the components preferably contain from about 1 to about 5 wt.% titanium, from about 10 to about 25 wt.% magnesium, less than about 1 wt.% silicon, and from about 45 to about 65 wt.% halogen. From the standpoint of attaining maximum efficiency of titanium, catalyst components which are more preferred according to this invention contain from about 2.0 to about 4.0 wt.% titanium, from about 15 to about 20 wt.% magnesium, less than about 0.5 wt.% silicon, and from about 50 to about 60 wt.% chlorine. When Group II or IIIA metal alkyl is used in pretreatment, the final catalyst component contains less than about 1.0 wt.% Group II or IIIA metal.

Prior to use in the polymerization of alpha-olefins, the invented catalyst components can be mechanically activated if desired. The preferred technique for mechanically activating the invented catalyst components is dry ball-milling, that is, ball-milling in the absence of inert diluent. However, good results also can be obtained by ball-milling in the presence of a minor amount of an inert diluent such as hexane or another alkane, as well as by other techniques. It also is contemplated to mechanically activate the invented catalyst components in the presence of one or more organic electron donors of the general type employed in preparation of the catalyst components. Optimum mechanical activation techniques and conditions can be determined by persons of skill in the art on the basis of the examples appearing hereinafter.

The catalysts of this invention comprise a stereospecific supported component as described above, and at least one organoaluminum activator. Preferably, the invented catalysts further comprise one or more crystallinity promoters capable of further improving catalyst stereospecificity. Suitable organoaluminum activators include trialkylaluminum compounds and dialkylaluminum hydrides having 1 to about 12 carbon atoms per alkyl radical. Specific examples of useful organoaluminum compounds include $Al(CH_3)_3$, $Al(C_2H_5)_3$, $Al(C_3H_7)_3$, $Al(C_4H_9)_3$, $Al(C_5H_{11})_3$, $Al(C_6H_{13})_3$, $Al(C_8H_{17})_3$, $Al(C_{12}H_{25})_3$, $Al(CH_3)_2H$, $Al(C_2H_5)_2H$, $Al(C_3H_7)_2H$, $Al(C_4H_9)_2H$, $Al(C_5H_{11})_2H$, $Al(C_6H_{13})_2H$, $Al(C_8H_{17})_2H$, and $Al(C_{12}H_{25})_2H$. Mixtures also can be employed if desired. Preferred organoaluminum compounds are the trialkylaluminums containing 2 to about 6 carbon atoms per alkyl radical as these lead to best results in terms of activity and stereospecificity. Most preferably, the organoaluminum compound is triethylaluminum. The organoaluminum compound is employed in at least an amount which is effective to promote the polymerization activity of the supported component. Preferably the molar ratio of organoaluminum component to titanium in the supported component is at least about 3:1. More preferably, this ratio ranges from about 5:1 to about 300:1, although substantially greater amounts of organoaluminum component also can be employed and often gives highly desirable results.

Useful crystallinity promoters are materials capable of further improving the stereospecificity of the invented catalysts and include a wide variety of compounds and combinations thereof. Examples of useful materials include a variety of organic electron donors, such as those employed in preparation of the invented, stereospecific supported catalyst components, and various inorganic mineral acids, anhydrides, and derivatives, including those employed in pretreatment as described hereinabove. The particular materials or combination to be employed can be readily determined by persons of skill in the art and the examples appearing hereinafter illustrate the use of various crystallinity promoters. Preferred materials are those capable of improving stereospecificity without leading to substantial decreases in activity. Examples of preferred crystallinity promoters include ethyl benzoate, ethyl-p-anisate, ethyl pivalate, 2,2,6,6-tetramethylpiperidine, 2-benzylpyridine, 2-acetylpyridine, and combinations thereof.

The above-described catalysts are useful in the stereospecific polymerization of alpha-olefins of 3 or more carbon atoms such as propylene, butene-1, pentene-1, 4-methylpentene-1, and hexene-1, as well as mixtures thereof and mixtures thereof with ethylene. The invented catalysts are particularly effective in the stereospecific polymerization of propylene or mixtures thereof with up to about 20 mole % ethylene or a higher alpha-olefin. Propylene homopolymerization is most preferred. According to the invention, highly crystalline polyalpha-olefins are prepared by contacting at least one alpha-olefin with the above-described catalyst compositions under polymerizing conditions. Such conditions include polymerization temperature and time, monomer pressure, avoidance of contamination of catalyst, choice of polymerization medium in slurry processes, the use of additives to control polymer molecular weights, and other conditions well known to persons of skill in the art. Slurry, bulk, and vapor phase polymerization processes are contemplated herein.

The amount of catalyst to be employed varies depending on choice of polymerization technique, reactor size, monomer to be polymerized, and other factors known to persons of skill in the art, and can be determined on the basis of the examples appearing hereinafter.

Irrespective of the polymerization process employed, polymerization should be carried out at temperatures sufficiently high to ensure reasonable polymerization rates and avoid unduly long reactor residence times, but not so high as to result in the production of unreasonably high levels of stereorandom products due to excessively rapid polymerization rates. Generally, temperatures range from about 0° to about 120° C. with about 20° to about 95° C. being preferred from the standpoint of attaining good catalyst performance and high production rates. More preferably, polymerization according to this invention is carried out at temperatures ranging from about 50° to about 80° C.

Alpha-olefin polymerization according to this invention is carried out at monomer pressures of about atmospheric or above. Generally, monomer pressures range from about 20 to about 600 psi, although in vapor phase polymerizations, monomer pressures should not exceed the vapor pressure, at the polymerization temperature, of the alpha-olefin to be polymerized.

The polymerization time is not critical and will generally range from about ½ to several hours in batch processes. Polymerization times ranging from about 1 to about 4 hours are typical in autoclave type reactions. In slurry processes, the polymerization time can be regulated as desired. Polymerization times ranging from about ½ to several hours are generally sufficient in continuous slurry processes.

Diluents suitable for use in slurry polymerization processes include alkanes and cycloalkanes such as pentane, hexane, heptane, n-octane, isooctane, cyclohexane, and methylcyclohexane; alkylaromatics such as toluene, xylene, ethylbenzene, isopropylbenzene, ethyl toluene, n-propyl-benzene, diethylbenzenes, and mono- and dialkylnaphthalenes; halogenated and hydrogenated aromatics such as chlorobenzene, chloronaphthalene, ortho-dichlorobenzene, tetrahydronaphthalene, decahydronaphthalene; high molecular weight liquid paraffins or mixtures thereof, and other well known diluents. It often is desirable to purify the polymerization medium prior to use such as by distillation, percolation through molecular sieves, contacting with a compound such as an alkylaluminum compound capable of removing trace impurities, or by other suitable means.

Irrespective of polymerization technique, polymerization is carried out under conditions that exclude oxygen, water, and other materials that act as catalyst poisons. Typically, no special precautions need be taken to exclude such materials because a positive pressure of monomer gas commonly exists within the reactor.

Also, according to this invention, polymerization can be carried out in the presence of additives to control polymer molecular weights. Hydrogen is typically employed for this purpose in a manner well known to persons of skill in the art.

Upon completion of polymerization, or when it is desired to terminate polymerization or deactivate the catalysts of this invention, the catalysts can be contacted with water, alcohols, acetone, or other suitable catalyst deactivators in a manner known to persons of skill in the art.

The products produced in accordance with the process of this invention are normally solid, predominantly isotactic polyalpha-olefins. Polymer yields are sufficiently high, relative to the amount of catalyst employed, that useful products can be obtained without separation of catalyst residues. Further, levels of stereorandom by-products are sufficiently low that useful products can be obtained without separation thereof. The polymeric products produced in the presence of the invented catalysts can be fabricated into useful articles by extrusion, injection molding, and other common techniques.

The following examples illustrate the present invention and are not to be construed as limiting the scope thereof.

EXAMPLE 1

(A) Preparation of Pretreatment Product

Into a 1 liter flask equipped with magnetic stirrer and maintained under nitrogen in a drybox were added 100 ml n-hexane and 11.4 g (0.1 mole) anhydrous magnesium ethoxide (obtained from Dynamit Nobel) at ambient temperature (22°–25° C.). The resulting suspension was stirred and 10 ml polymethylhydrogensiloxane (obtained from Aldrich Chemical Co., identified as PMHS, refractive index at 20° C.=1.3979, Flash point=121° C.) were added dropwise to the stirred suspension over about ¼ hour at ambient temperature. Stirring was continued for 1 hour following completion of the polysiloxane addition and then the solid reaction product was allowed to settle. Supernatant then was decanted and the solid washed twice with 125 ml portions of hexane. The resulting pretreatment product then was suspended in 450 ml n-nonane.

(B) Preparation of Supported Catalyst Component

Into a 1 liter flask equipped as in (A) were added the suspension of pretreatment product prepared in (A) and 50 ml (0.46 mole) titanium tetrachloride at ambient temperature. To the resulting mixture there were added dropwise a solution of 2 ml (0.014 mole) ethyl benzoate in 50 ml n-nonane over about ¼ hour at ambient temperature and with stirring. After addition of the ethyl benzoate solution was completed the mixture was heated to 140°-145° C., stirred at that temperature for about 1½ hours, and then allowed to cool to about 115°-120° C. Supernatant then was decanted and the remaining solid was washed four times with 150 ml portions of hexane. After the final wash, the solid was separated from the liquid by filtration and samples, identified as 1(B), were employed in the polymerization of propylene as described in (D).

(C) Mechanical Activation of Supported Catalyst Component

A portion of the solid catalyst component prepared in (B) and 90 stainless steel balls having a diameter of 10 mm. were placed in a Roalox, burundum-fortified porcelain mill jar (manufactured by A. Daigger Company) having a capacity of ¼ quart (about 280 ml.) and milled in a rotary ball mill (manufactured by Paul O. Abbe, Inc., motor speed=1725 rpm) for 5 hours at ambient temperature under an atmosphere of dry nitrogen. The solid then was removed from the mill jar, separated from the steel balls, and suspended in 200 ml dry n-hexane. Aliquots of the suspension, identified as 1(C) were employed in the polymerization of propylene as described in (D). (D) Propylene Polymerization A series of propylene polymerizations were conducted using supported components 1(B) and 1(C) according to the following procedure. Amounts of catalyst component (0.050 g in runs using 1(B) and an amount of suspension containing 0.049 g in runs using 1(C)), an amount of 25 wt.% triethylaluminum in hexane (TEA) and, in some runs, various crystallinity promoters were added to 200 ml dry n-hexane in a 450 ml pressure bottle equipped with magnetic stirrer after which the bottle was sealed and placed in a 60° C. oil bath. Polymerization grade propylene then was charged to the bottle at 50 psig (about 3.52 kg/cm²) and the contents of the bottle were stirred. After 1 hour, the bottle was cooled, opened, and the contents filtered. The resulting white solid polypropylene was dried at ambient temperature and weighed. Hexane solubles were determined by evaporating the filtrate to dryness and weighing the solid residue. Results are reported in TABLE I. In the table, crystallinity promoters are identified as follows:

ethyl benzoate (EB);
ethyl p-anisate (EA);
bis-(tri-n-butyltin) sulfide (BTS);
2,2,6,6-tetramethylpiperidine (TMP);
2-benzylpyridine (BP);
2-acetylpyridine (AP);
hexamethyl phosphoramide (HMPA).

TABLE I

| RUN NO. | CATALYST COMPONENT | TEA (ml) | CRYSTALLINITY PROMOTER (ml) | ACTIVITY[1] | HEXANE SOLUBLES[2] |
|---|---|---|---|---|---|
| 1 | 1(B) | 0.10 | None | 379 | 18.8 |
| 2 | 1(C) | 0.10 | None | 522 | 20.0 |
| 3 | 1(B) | 0.15 | 0.006 EB + 0.003 EA | 198 | 4.0 |
| 4 | 1(C) | 0.15 | 0.006 EB + 0.003 EA | 236 | 3.4 |
| 5 | 1(B) | 0.15 | 0.006 EB + 0.003 BTS | 241 | 4.9 |
| 6 | 1(C) | 0.15 | 0.006 EB + 0.003 BTS | 530 | 5.0 |
| 7 | 1(C) | 0.20 | 0.008 EB + 0.003 BTS | 727 | 4.9 |
| 8 | 1(B) | 0.15 | 0.006 EB + 0.003 TMP | 268 | 5.7 |
| 9 | 1(C) | 0.15 | 0.006 EB + 0.003 TMP | 322 | 3.6 |
| 10 | 1(C) | 0.20 | 0.007 EB + 0.003 TMP | 617 | 3.9 |
| 11 | 1(C) | 0.20 | 0.007 EB + 0.004 TMP | 446 | 4.2 |
| 12 | 1(B) | 0.15 | 0.006 EB + 0.003 BP | 197 | 3.2 |
| 13 | 1(C) | 0.15 | 0.006 EB + 0.003 BP | 336 | 4.0 |
| 14 | 1(B) | 0.15 | 0.006 EB + 0.003 AP | 76 | 3.7 |
| 15 | 1(C) | 0.15 | 0.006 EB + 0.003 AP | 87 | 3.1 |
| 16 | 1(C) | 0.15 | 0.006 EB + 0.003 HMPA | 308 | 3.0 |
| 17 | 1(C) | 0.20 | 0.008 EB + 0.004 HMPA | 377 | 3.0 |
| 18 | 1(C) | 0.15 | 0.008 TMP + 0.003 BTS | 730 | 8.7 |

[1] Grams solid polypropylene per gram catalyst component per hour.
[2] wt. %.

EXAMPLE 2

The procedure of EXAMPLE 1 was followed except that in (A) the polymethylhydrogen siloxane was replaced with 5 ml (0.041 mole) dimethyldichlorosilane. In polymerization runs the amount of 2(B) was 0.050 g and the amount of 2(C) was 0.051 g. Results are reported in TABLE II.

TABLE II

| RUN NO. | CATALYST COMPONENT | TEA (ml) | CRYSTALLINITY PROMOTER (ml) | ACTIVITY[1] | HEXANE SOLUBLES[2] |
|---|---|---|---|---|---|
| 1 | 1(B) | 0.10 | None | 572 | 15.7 |
| 2 | 1(C) | 0.10 | None | 493 | 23.2 |
| 3 | 1(B) | 0.15 | 0.006 EB + 0.003 EA | 285 | 2.7 |
| 4 | 1(C) | 0.15 | 0.006 EB + 0.003 EA | 309 | 2.5 |
| 5 | 1(B) | 0.15 | 0.006 EB + 0.003 BTS | 500 | 4.6 |
| 6 | 1(C) | 0.15 | 0.006 EB + 0.003 BTS | 592 | 5.0 |
| 7 | 1(B) | 0.15 | 0.005 EB + 0.003 TMP | 358 | 4.1 |
| 8 | 1(C) | 0.15 | 0.006 EB + 0.003 TMP | 331 | 3.8 |
| 9 | 1(B) | 0.15 | 0.006 EB + 0.003 BP | 363 | 2.8 |
| 10 | 1(C) | 0.15 | 0.006 EB + 0.003 BP | 375 | 3.6 |
| 11 | 1(B) | 0.15 | 0.006 EB + 0.003 AP | 207 | 2.5 |
| 12 | 1(C) | 0.15 | 0.006 EB + 0.003 AP | 209 | 2.7 |

[1] Grams solid polypropylene per gram catalyst component per hour.
[2] wt. %.

EXAMPLE 3

The procedure of EXAMPLE 2 was repeated. In polymerization runs 0.050 g 3(B) and 0.049 g 3(C) were used. Results are reported in TABLE III.

TABLE III

| RUN NO. | CATALYST COMPONENT | TEA (ml) | CRYSTALLINITY PROMOTER (ml) | ACTIVITY[1] | HEXANE SOLUBLES[2] |
|---|---|---|---|---|---|
| 1 | 3(B) | 0.10 | None | 546 | 17.6 |
| 2 | 3(C) | 0.10 | None | 182 | 27.1 |
| 3 | 3(C) | 0.10 | None | 232 | 22.9 |
| 4 | 3(B) | 0.15 | 0.006 EB + 0.003 EA | 338 | 3.6 |
| 5 | 3(C) | 0.15 | 0.006 EB + 0.003 EA | 83 | 5.3 |
| 6 | 3(C) | 0.15 | 0.006 EB + 0.003 EA | 63 | 6.6 |
| 7 | 3(B) | 0.15 | 0.006 EB + 0.003 BTS | 556 | 7.4 |
| 8 | 3(C) | 0.15 | 0.006 EB + 0.003 BTS | 151 | 6.0 |
| 9 | 3(C) | 0.15 | 0.006 EB + 0.003 BTS | 111 | 10.9 |
| 10 | 3(B) | 0.15 | 0.006 EB + 0.003 TMP | 449 | 5.7 |
| 11 | 3(C) | 0.15 | 0.006 EB + 0.003 TMP | 86 | 5.5 |
| 12 | 3(C) | 0.15 | 0.006 EB + 0.003 TMP | 46 | 6.2 |
| 13 | 3(B) | 0.15 | 0.006 EB + 0.003 BP | 456 | 5.4 |
| 14 | 3(C) | 0.15 | 0.006 EB + 0.003 BP | 137 | 6.1 |
| 15 | 3(C) | 0.15 | 0.006 EB + 0.003 BP | 57 | 6.0 |
| 16 | 3(B) | 0.15 | 0.006 EB + 0.003 AP | 229 | 3.2 |
| 17 | 3(C) | 0.15 | 0.006 EB + 0.003 AP | 31 | 4.4 |
| 18 | 3(C) | 0.15 | 0.006 EB + 0.003 AP | 34 | 5.6 |

[1]Grams solid polypropylene per gram catalyst component per hour.
[2]wt. %.

Comparison of the data for components 2(B) and 3(B) shows reproducible results although both activity and solubles were somewhat higher for 3(B). The poor activities and solubles levels in runs with 3(C) are indicative of severe contamination during ball milling.

EXAMPLE 4

The procedure of EXAMPLE 1 was repeated except that in (A) polymethylhydrogen siloxane was replaced by a mixture of 10 ml 25 wt.% triethylaluminum in hexane (containing 0.015 mole triethylaluminum) and 0.5 ml (0.0041 mole) dimethyldichlorosilane. In polymerization runs 0.050 g 4(B) and 0.051 g 4(C) were used. Results are reported in TABLE IV.

TABLE IV

| RUN NO. | CATALYST COMPONENT | TEA (ml) | CRYSTALLINITY PROMOTER (ml) | ACTIVITY[1] | HEXANE SOLUBLES[2] |
|---|---|---|---|---|---|
| 1 | 4(B) | 0.10 | None | 438 | 16.2 |
| 2 | 4(C) | 0.10 | None | 505 | 21.6 |
| 3 | 4(B) | 0.15 | 0.006 EB + 0.003 EA | 262 | 3.0 |
| 4 | 4(C) | 0.15 | 0.006 EB + 0.003 EA | 270 | 2.2 |
| 5 | 4(C) | 0.20 | 0.006 EB + 0.003 EA | 318 | 2.9 |
| 6 | 4(C) | 0.15 | 0.006 EB + 0.002 EA | 260 | 2.5 |
| 7 | 4(C) | 0.20 | 0.006 EB + 0.004 EA | 282 | 2.3 |
| 8 | 4(B) | 0.15 | 0.006 EB + 0.003 BTS | 463 | 4.9 |
| 9 | 4(C) | 0.15 | 0.006 EB + 0.003 BTS | 389 | 4.1 |
| 10 | 4(B) | 0.15 | 0.006 EB + 0.003 TMP | 288 | 3.8 |
| 11 | 4(C) | 0.15 | 0.006 EB + 0.003 TMP | 338 | 3.2 |
| 12 | 4(B) | 0.15 | 0.006 EB + 0.003 BP | 384 | 4.5 |
| 13 | 4(C) | 0.15 | 0.006 EB + 0.003 BP | 376 | 3.7 |
| 14 | 4(B) | 0.15 | 0.006 EB + 0.003 AP | 230 | 2.9 |
| 15 | 4(C) | 0.15 | 0.006 EB + 0.003 AP | 257 | 3.5 |
| 16 | 4(C) | 0.20 | 0.006 EB + 0.003 AP | 363 | 4.6 |
| 17 | 4(C) | 0.15 | 0.006 EB + 0.002 AP | 241 | 2.8 |
| 18 | 4(C) | 0.20 | 0.006 EB + 0.004 AP | 288 | 2.7 |

[1]Grams solid polypropylene per gram catalyst component per hour.
[2]wt. %.

EXAMPLES 1-4 and TABLES I-IV illustrate preparation of the invented supported catalyst components and the polymerization performance of catalysts containing the same. Typically, activities were sufficiently high and hexane solubles sufficiently low to eliminate the need for separation of catalyst residues and by-products. Subsequent to the above-described preparations and polymerizations, higher than normal levels of impurities were discovered in the sources of reagents used. Activities higher than those reported in TABLES I-IV would be expected with purer reagents.

COMPARATIVE EXAMPLE A

The procedure of EXAMPLE 4 of application Ser. No. 14,891 was repeated using reagents from the same sources as were used in EXAMPLES 1-4 herein. In polymerization runs 0.050 g. A(B) and 0.050 g. A(C) were used. Results are reported in TABLE A.

TABLE A

| RUN NO. | CATALYST COMPONENT | TEA (ml) | CRYSTALLINITY PROMOTER (ml) | ACTIVITY[1] | HEXANE SOLUBLES[2] |
|---|---|---|---|---|---|
| 1 | A(B) | 0.10 | None | 551 | 16.9 |
| 2 | A(C) | 0.10 | None | 573 | 32.9 |
| 3 | A(B) | 0.15 | 0.006 EB + 0.003 EA | 302 | 3.1 |
| 4 | A(C) | 0.15 | 0.006 EB + 0.003 EA | 573 | 2.4 |
| 5 | A(B) | 0.15 | 0.006 EB + 0.003 BTS | 536 | 5.3 |
| 6 | A(C) | 0.15 | 0.006 EB + 0.003 BTS | 837 | 5.5 |
| 7 | A(B) | 0.15 | 0.006 EB + 0.003 TMP | 482 | 4.9 |
| 8 | A(C) | 0.15 | 0.006 EB + 0.003 TMP | 632 | 4.4 |
| 9 | A(B) | 0.15 | 0.006 EB + 0.003 BP | 313 | 3.5 |
| 10 | A(C) | 0.15 | 0.006 EB + 0.003 BP | 620 | 3.7 |
| 11 | A(B) | 0.15 | 0.006 EB + 0.003 AP | 354 | 4.1 |
| 12 | A(C) | 0.15 | 0.006 EB + | 454 | 2.7 |

TABLE A-continued

| RUN NO. | CATALYST COMPONENT | TEA (ml) | CRYSTALLINITY PROMOTER (ml) | ACTIVITY[1] | HEXANE SOLUbles[2] |
|---|---|---|---|---|---|
| | | | 0.003 AP | | |

[1] Grams solid polypropylene per gram catalyst component per hour.
[2] wt. %.

COMPARATIVE EXAMPLE B

The procedure of EXAMPLE 1 of application Ser. No. 14,891 was repeated using reagents from the same sources as were used in EXAMPLES 1–4 herein. In polymerization runs 0.050 g B(A) and 0.049 g B(B) were used. Results are reported in TABLE B.

TABLE B

| RUN NO. | CATALYST COMPONENT | TEA (ml) | CRYSTALLINITY PROMOTER (ml) | ACTIVITY[1] | HEXANE SOLUBLES[2] |
|---|---|---|---|---|---|
| 1 | B(B) | 0.10 | None | 547 | 15.8 |
| 2 | B(C) | 0.10 | None | 654 | 25.9 |
| 3 | B(B) | 0.15 | 0.006 EB + 0.003 EA | 377 | 3.3 |
| 4 | B(C) | 0.15 | 0.006 EB + 0.003 EA | 474 | 2.8 |
| 5 | B(B) | 0.15 | 0.006 EB + 0.003 BTS | 552 | 6.2 |
| 6 | B(C) | 0.15 | 0.006 EB + 0.003 BTS | 945 | 7.7 |
| 7 | B(B) | 0.15 | 0.006 EB + 0.003 TMP | 550 | 5.8 |
| 8 | B(C) | 0.15 | 0.006 EB + 0.003 TMP | 756 | 5.0 |
| 9 | B(B) | 0.15 | 0.006 EB + 0.003 BP | 472 | 4.2 |
| 10 | B(C) | 0.15 | 0.006 EB + 0.003 BP | 667 | 4.1 |
| 11 | B(B) | 0.15 | 0.006 EB + 0.003 AP | 345 | 3.7 |
| 12 | B(C) | 0.15 | 0.006 EB + 0.003 AP | 556 | 3.5 |

[1] Grams solid polypropylene per gram catalyst component per hour.
[2] wt. %.

Comparison of TABLES A and B with TABLES I–IV reveals that the invented catalysts exhibited generally comparable or somewhat lower activities than the catalysts of Ser. No. 14,891; however, stereospecificity of the former typically was better as evidenced by the hexane solubles data.

We claim:

1. A catalyst composition comprising
   (A) at least one organoaluminum component; and
   (B) a solid reaction product of components comprising
   (1) at least one titanium(IV) halide or haloalcoholate containing 1 to about 20 carbon atoms per alcoholate group;
   (2) at least one organic electron donor containing at least one of oxygen, nitrogen, sulfur and phosphorus; and
   (3) at least one hydrocarbon-insoluble, magnesium-containing pretreatment product of components comprising
   (a) at least one magnesium alcoholate and
   (b) at least one organosilicon component selected from the group conisting of silanes corresponding to the formula $R_xSiX_{4-x}$ wherein each R is independently a hydrocarbyl radical of 1 to about 20 carbon atoms, X is hydrogen or halogen and $1 \leq X \leq 4$; hydrocarbyl disilazanes and trisilazanes containing 1 to about 20 carbon atoms per hydrocarbyl radical; and liquid polysiloxanes corresponding to the formula

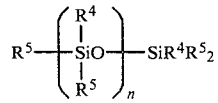

wherein each $R^4$ is independently a hydrocarbyl radical of 1 to about 20 carbon atoms, each $R^5$ is independently hydrogen or $R^4$ and n is an integer equal to or greater than 2, wherein (3)(b) is present in an amount effective to improve polymerization performance, the atomic ratio of titanium in (1) to metal in (3) (a) is at least about 0.5:1, and (2) is employed in an amount ranging from about 0.001 to about 1 mole per gram-atom of titaniun contained in (1); said reaction product being prepared by combining, in the substantial absence of extraneous catalyst poisons, component (1) with a suspension of component (3) in an inert hydrocarbon or halogenated hydrocarbon diluent and then adding component (2) to the resulting mixture, or by adding a mixture of components (1) and (2) to a suspension of (3) in an inert hydrocarbon or halogenated hydrocarbon diluent.

2. The catalyst of claim 1 wherein (2) comprises a $C_{1-6}$ alkyl ester of an aromatic monocarboxylic acid or of an aromatic monocarboxylic acid substituted with at least one of halogen, hydroxyl, oxo, alkyl, alkoxy, aryl or aryloxy.

3. The catalyst of claim 2 wherein (1) comprises titanium tetrachloride.

4. The catalyst of claim 3 wherein (3)(a) comprises a magnesium alcoholate of the formula $Mg(OR^1)_2$ wherein $R^1$ is an alkyl radical of 1 to about 6 carbon atoms, an aryl radical of 6 to about 12 carbon atoms or an alkaryl or aralkyl radical of 6 to about 12 carbon atoms.

5. The catalyst of claim 4 wherein (3)(b) comprises at least one silane of the formula $R_xSiX_{4-x}$ wherein R is alkyl of 1 to about 6 carbons, X is hydrogen or halogen and $1 \leq X \leq 4$; alkylidislazane or alkyltrisilazane containing 1 to about 6 carbons per alkyl radical; or liquid polysiloxane of the formula

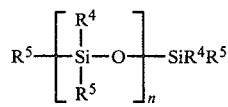

wherein each $R^4$ is an alkyl radical of 1 to about 6 carbon atoms, each $R^5$ is independently hydrogen or $R^4$ and n is an integer equal to or greater than 2.

6. The catalyst of claim 1 wherein the components in (3) further comprise at least one Group II or IIIA metal alkyl, at least one pretreatment modifier selected from the group consisting of mineral acids and anhydrides of sulfur, organometallic chalcogenide derivatives of hydrogen sulfide in which each hydrogen is replaced by an organosilicon, organogermanium or organotin group wherein the organic radicals are selected from the group consisting of phenyl, alkyl-substituted phenyl, phenyl-substituted alkyl, and alkyl, such alkyl radicals containing 1 to about 6 carbon atoms, and organic acids containing from 1 to about 20 carbon atoms and 1 to about 4 carboxyl groups and the $C_1$ to about $C_{12}$ alkyl and haloalkyl and $C_6$ to about $C_{10}$ aryl and haloaryl esters of said acids, or a mixture of at least one of said metal alkyls with at least one of said pretreatment modifiers.

7. The catalyst of claim 1 wherein the solid component (B) is mechanically activated.

8. The catalyst of claim 1 further characterized in that said catalyst comprises at least one crystallinity promoter.

9. The catalyst of claim 1 wherein (A) comprises a trialkylaluminum containing 1 to about 6 carbon atoms per alkyl radical.

10. A catalyst composition comprising
(A) triethylaluminum or triisobutylaluminum and
(B) a solid reaction product of
    (1) titanium tetrachloride,
    (2) ethyl benzoate, and
    (3) a hydrocarbon-insoluble reaction product of
        (a) magnesium ethoxide and
        (b) polymethylhydrogen siloxane or dimethyldichlorosilane in an amount effective to improve polymerization performance;
wherein the atomic ratio of titanium in (1) to magnesium in (3) (a) ranges from about 0.5:1 to about 20:1 and (2) is employed in an amount ranging from about 0.01 to about 0.3 mole per gram-atom of titanium in (1); said reaction product being prepared by combining, in the substantial absence of extraneous catalyst poisons, component (1) with a suspension of component (3) in an inert hydrocarbon or halogenated hydrocarbon diluent and then adding component (2) to the resulting mixture, or by adding a mixture of components (1) and (2) to a suspension of (3) in an inert hydrocarbon or halogenated hydrocarbon diluent.

11. The catalyst of claim 10 further comprising at least one crystallinity promoter.

12. A process for production of catalyst component comprising
(A) contacting components comprising (1) at least one magnesium alcoholate and (2) at least one organosilicon component selected from the group consisting of silanes corresponding to the formula $R_xSiX_{4-x}$ wherein each R is independently a hydrocarbyl radical of 1 to about 20 carbon atoms, X is hydrogen or halogen and $1 \leq x \leq 4$; hydrocarbyl disilazanes and trisilazanes containing 1 to about 20 carbon atoms per hydrocarbyl group; and liquid polysiloxanes corresponding to the formula

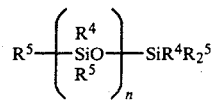

wherein each $R^4$ is independently a hydrocarbyl radical of 1 to about 20 carbon atoms, each $R^5$ is independently hydrogen or $R^4$ and n is an integer equal to or greater than 2, said organosilicon component being present in an amount which is effective to improve polymerization performance;

(B) removing unreacted organosilicon component from the product of (A) to form a hydrocarbon-insoluble, magnesium-containing pretreatment product; and (C) contacting a suspension of said pretreatment product in an inert hydrocarbon or halogenated hydrocarbon diluent with components comprising at least one titanium(IV) halide or haloalcoholate containing 1 to about 20 carbon atoms per alcoholate group and at least one organic electron donor containing at least one of oxygen, nitrogen, sulfur and phosphorus in amounts such that the atomic ratio of titanium to metal in (A)(1) is at least about 0.5:1 and the ratio of organic electron donor to titanium ranges from about 0.001 to about 1 mole per gram-atom, said suspension of pretreatment product, titanium(IV) component and electron donor being contacted concurrently or such that said electron donor is added to a mixture of said suspension of pretreatment product with titanium(IV) component to form a solid catalyst component.

13. The process of claim 12 wherein said electron donor comprises a $C_{1-6}$ alkyl ester of an aromatic monocarboxylic acid or of an aromatic monocarboxylic acid substituted with at least one of halogen, hydroxyl, oxo, alkyl, alkoxy, aryl, or aryloxy.

14. The process of claim 13 wherein said titanium(IV) halide or haloalcoholate comprises titanium tetrachloride.

15. The process of claim 14 wherein said organosilicon component comprises at least one silane of the formula $R_xSiX_{4-x}$ wherein R is an alkyl radical of 1 to about 6 carbons, X is hydrogen or halogen and $1 \leq x \leq 4$; alkyldisilazane or alkyltrisilazane containing 1 to about 6 carbons per alkyl radical, or liquid polysiloxane of the formula

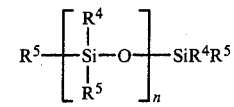

wherein each $R^4$ is independently an alkyl radical of 1 to about 6 carbon atoms, each $R^5$ is independently hydrogen or $R^4$ and n is an integer equal to or greater than 2.

16. The process of claim 12 further characterized in that said solid catalyst component is mechanically activated.

17. The process of claim 12 wherein the components in (A) further comprise at least one Group II or IIIA metal alkyl, at least one pretreatment modifier selected from the group consisting of mineral acids and anhydrides of sulfur, organometallic chalcogenide derivatives of hydrogen sulfide wherein each hydrogen is replaced by an organosilicon, organogermanium or organotin group wherein the organic radicals are selected from the group consisting of phenyl, alkyl-substituted phenyl, phenyl-substituted alkyl and alkyl radicals, such alkyl radicals containing 1 to about 6 carbon atoms, and organic acids containing from 1 to about 20 carbons atoms and 1 to about 4 carboxyl groups and the $C_1$ to about $C_{12}$ alkyl and haloalkyl and $C_6$ to about $C_{10}$ aryl and haloaryl esters of said acids, or a mixture of at least one of said metal alkyls with at least one of said pretreatment modifiers.

* * * * *

UNITED STATES PATENT OFFICE
CERTIFICATE OF CORRECTION

Patent No. 4,324,690  Dated April 13, 1982

Inventor(s) NICHOLAS M. KARAYANNIS and JOHN S. SKRYANTZ

It is certified that error appears in the above-identified patent and that said Letters Patent are hereby corrected as shown below:

| Column | Line | |
|---|---|---|
| 3 | 33 | "carbon" should be --carbons--. |
| 15 | 24 | "(D) Propylene Polymerization" should begin a new line. |
| 20 | 49 | "alkylidislazane" should be --alkyldisilazane--. |

Signed and Sealed this

Seventh Day of December 1982

[SEAL]

Attest:

GERALD J. MOSSINGHOFF

Attesting Officer   Commissioner of Patents and Trademarks